UNITED STATES PATENT OFFICE 2,433,450

CEMENT COMPOSITIONS

Richard H. Grant, San Francisco, Calif., assignor to Permanente Cement Company, Oakland, Calif., a corporation of California No Drawing. Application January 24, 1945, Serial No. 574,440

3 Claims. (Cl. 106—95)

This invention relates to a plastic cement, particularly one having a Portland type cement base, and is continuation-in-part of my copending application Serial No. 502,195, filed September 13, 1943, now abandoned.

One of the principal problems that has confronted the building industry for many years has been the inability to obtain a weather-proof plaster which would adhere to paper covered lath or the like, such as gypsum plasterboard lath, and at the same time have the other characteristics of a desirable plaster. Another problem which has also presented a considerable disadvantage has been the lack of a satisfactory plaster or plastic cement of a Portland cement base which would adhere to paper covered lath or the like.

It is among the objects of the present invention to overcome the above and other problems and disadvantages by providing a plastic cement having a Portland type cement base, which cement is particularly useful as a plaster or mortar.

According to the invention there is provided a dry homogeneous mixture of a plastic cement comprising Portland cement and an additive of asbestos fibre, calcium chloride, hydrated lime and an alkaline earth metal soap. The quantities of Portland cement to additive may vary between about eighty-five to ninety-five pounds of Portland cement to about five to fifteen pounds of additive. The preferred mix is about ninety pounds of Portland cement to about ten pounds of additive.

The basic constituents of the additive are calcium chloride and asbestos. The quantity of calcium chloride in the cement should be below about three pounds to each 100 lbs. of Portland cement and is preferably at least one pound to each ninety pounds of cement. The quantity of asbestos may vary between about 5 pounds and about 10 pounds to each 100 pounds of the final composition, with 6 pounds being preferred.

The preferred composition of the additive includes 1 pound of crystalline calcium chloride, 6 pounds of asbestos fibre, 3 pounds of hydrated lime, and 1 ounce of an alkaline earth metal soap such as calcium stearate.

In the additive the asbestos is useful because of its unique water retaining ability, its expansion factor when dehydrating to offset cement shrinkage, and as a plasticizer. The crystalline calcium chloride increases the initial strength of the mortar and in combination with the other materials acts as an adhesive agent. The hydrated lime adds workability and plasticity. The alkaline earth metal soap acts as a water-proofing agent.

The additive may be blended with the Portland cement in such manner as will yield a homogeneous mixture. In practice it is useful to grind the calcium chloride, asbestos fibre, hydrated lime and calcium stearate or other alkaline earth metal soap together and then mix the resultant finely divided mass with the Portland cement. The mixing of the finely divided additive and the Portland cement may be effected by blowing the materials into an air cyclone cylinder which includes one or more paddle agitators (such as a Straub mixing machine) to insure complete intermixing and cement coating of each particle of the admixture, particularly of the finely ground calcium chloride. In alternative procedures the Portland cement and the constituents of the additive can be ground together at one time either by first preparing the homogeneous mixture of calcium chloride, asbestos fibre, hydrated lime and alkaline earth metal soap and adding it to the raw cement clinker, or by adding the constituents of the additive in the raw state to the cement clinker and intergrinding them all simultaneously. Talc may be used as a grinding aid in any of these procedures. The preferred practice is to intergrind each of the raw materials simultaneously.

However, regardless of the procedure employed, it is essential to the present invention that the composition of the additive be incorporated with the cement under such conditions that the cement coats the particles of the additive so as to form a dry, finely divided, homogeneous mass. The additive is not an "admix" in the sense that it can be incorporated in a cement mixer with the cement, aggregate and water. Various compositions have been proposed heretofore and termed "admixes." However, these are added to the cement mixture along with the sand, cement, and water and are only conditioned with the cement in the mixer. Such a method of mixing is unsatisfactory because the ingredients are not sufficiently blended and interdispersed to provide the necessary adhesion and plasticity which are among the objects of the invention.

I have found that finely divided dry homogeneous mixture of calcium chloride, hydrated lime, fibrous asbestos and calcium stearate intimately ground to a fine powdered state in a ball mill or a stone mill and mixed with a Portland cement provides a plastic cement possessing the following desirable characteristics:

For example:

The composition of this additive and Portland type cement mixed with a relatively large volume of sand (3½ to 4 volumes of sand to 1 volume of the composition of the invention) can be hydrated with a minimum amount of water to form a very plastic, workable plaster or mortar, which, when applied to a wall or ceiling surface, does not check, crack or craze. Because of the increased sand-carrying capacity of this material the shrinkage, common to Portland cement, is offset by this composition.

A plaster made of Portland cement and this composition, to which is added 2½ to 3 volumes of sand and sufficient water to form a workable, plastic plaster, will adhere to and bond with ordinary gypsum plaster lath, something which no Portland cement plaster would do heretofore. Because of the presence of the asbestos fibre, hydrated lime and calcium chloride, the water retention ability of this composition insures a more even and proper cure than before attained with ordinary Portland cement mortar. This is indicated by the following: Two series of test blocks were made utilizing equal parts of sand, water and Portland cement in one case and, in the other, a cement containing the material of the present invention. The blocks were stored in a room having constant temperature and humidity and were weighed at regular intervals. Those blocks including the composition of this invention did not dehydrate nearly as rapidly as the blocks containing only Portland cement and sand. A compression test of all the blocks after seven days of curing showed the blocks containing the composition of this invention to have considerably more strength than the blocks without this composition.

A further advantage of the composition of this invention is the entire elimination of the formation of a hard skin or surface, on the plastered wall, while the mass remains pulpy or soft below this hard skin, resulting in a weak, undercured wall. This material may be mixed into plaster or mortar in a central mixing plant and distributed in volume by trucks or other carriers to workmen on the job where the plastic plaster can be held in mortar boxes from 1 to 3 hours and still be highly plastic and workable. If a slight initial set occurs during this period, the mortar can be retempered with a small amount of water and stirring, returning the plaster to full plasticity without loss of strength or adhesive ability.

Although the water-proofing agent has been described as an alkaline earth metal soap, specifically calcium stearate, it is to be understood that any water-proofing agent, i. e., water repellant agent, which will function substantially similar to an alkaline earth metal soap may satisfactorily be used in the composition of the invention in place of the alkaline earth metal soap.

What is claimed is:

1. A plastic cement composition for use on paper covered lath comprising, a dry, finely divided mixture of the following:

| | Parts |
|---|---|
| Portland cement | 90 |
| Calcium chloride | 1 |
| Asbestos | 6 |
| Hydrated lime | 3 |
| Alkaline earth metal soap less than | 0.1 |

2. An additive for incorporation into a dry, finely divided Portland cement comprising the following composition:

| | Part |
|---|---|
| Calcium chloride | 1 |
| Asbestos | 6 |
| Hydrated lime | 3 |
| Alkaline earth metal soap less than | 0.1 |

3. An additive for incorporation into a dry, finely divided Portland cement consisting of from 1 to 3 parts by weight of calcium chloride, from 5 to 10 parts by weight of asbestos, about 4 parts by weight of hydrated lime, and less than 0.1 part by weight of an alkaline earth metal soap.

RICHARD H. GRANT.

REFERENCES CITED

The following references are of record in the file of this patent:

UNITED STATES PATENTS

| Number | Name | Date |
|---|---|---|
| 1,452,463 | Huber | Apr. 17, 1923 |
| 2,230,747 | Greene | Feb. 4, 1941 |
| 2,302,988 | Witty | Nov. 24, 1942 |
| 1,961,525 | Offutt | June 5, 1934 |
| 2,213,038 | David | Aug. 27, 1940 |